(12) United States Patent
DeLizo et al.

(10) Patent No.: US 12,272,149 B2
(45) Date of Patent: Apr. 8, 2025

(54) TRACTOR-BASED TRAILER CLEARANCE AND POSITIONING SYSTEM AND METHOD

(71) Applicant: PACCAR Inc., Bellevue, WA (US)

(72) Inventors: Stanley W DeLizo, Lynnwood, WA (US); Ian David O'Connor, Seattle, WA (US); August Avantaggio, Kent, WA (US); Kyle Christopher Wynn Johnson, Vancouver, WA (US)

(73) Assignee: PACCAR Inc., Bellevue, WA (US)

( * ) Notice: Subject to any disclaimer, the term of this patent is extended or adjusted under 35 U.S.C. 154(b) by 559 days.

(21) Appl. No.: 17/535,142

(22) Filed: Nov. 24, 2021

(65) Prior Publication Data

US 2023/0162509 A1    May 25, 2023

(51) Int. Cl.
| | |
|---|---|
| G06V 20/56 | (2022.01) |
| B60R 11/04 | (2006.01) |
| G01B 17/00 | (2006.01) |
| G01S 15/08 | (2006.01) |
| G06T 7/60 | (2017.01) |
| G06T 7/70 | (2017.01) |
| G06V 10/44 | (2022.01) |
| B60R 11/00 | (2006.01) |

(52) U.S. Cl.
CPC .............. *G06V 20/56* (2022.01); *B60R 11/04* (2013.01); *G01B 17/00* (2013.01); *G01S 15/08* (2013.01); *G06T 7/60* (2013.01); *G06T 7/70* (2017.01); *G06V 10/44* (2022.01); *B60R 2011/004* (2013.01); *G06T 2207/30252* (2013.01)

(58) Field of Classification Search
CPC .. B60W 2530/205; G01B 17/00; G01S 15/08; G06T 7/60; G06T 2207/30252; G06T 7/70; B60R 2011/004; B60R 11/04; G06V 10/44; G06V 20/56
See application file for complete search history.

(56) References Cited

U.S. PATENT DOCUMENTS

| | | | | |
|---|---|---|---|---|
| 5,152,544 A | * | 10/1992 | Dierker, Jr. ........ | B62D 53/0871 280/446.1 |
| 2015/0291179 A1 | * | 10/2015 | Tagesson ............ | B60W 40/105 702/158 |
| 2019/0071088 A1 | * | 3/2019 | Hu ........................ | B60D 1/62 |
| 2020/0031276 A1 | * | 1/2020 | Noh ...................... | B60W 40/12 |
| 2020/0132835 A1 | * | 4/2020 | Han ...................... | B62D 13/06 |

FOREIGN PATENT DOCUMENTS

JP        2014002056 A  *  1/2014
WO    WO-2021007427 A1  *  1/2021

* cited by examiner

*Primary Examiner* — John Villecco
*Assistant Examiner* — Alexander John Rodgers
(74) *Attorney, Agent, or Firm* — Merchant & Gould, P.C.

(57) ABSTRACT

The present disclosure describes systems and methods for automated determination of certain physical characteristics of a trailer in a tractor-trailer truck and positional arrangement between the trailer and tractor of the truck. The technology may include a camera mounted on the tractor to acquire an image of at least a rear portion of the trailer; a sensor configured to acquire information relating to the trailer angle; a processor configured to determine a position of the rear portion of the trailer in the image, and determine the length of the trailer based at least in part on the determined position of the rear portion of the trailer in the image and the information relating to the trailer angle.

14 Claims, 9 Drawing Sheets

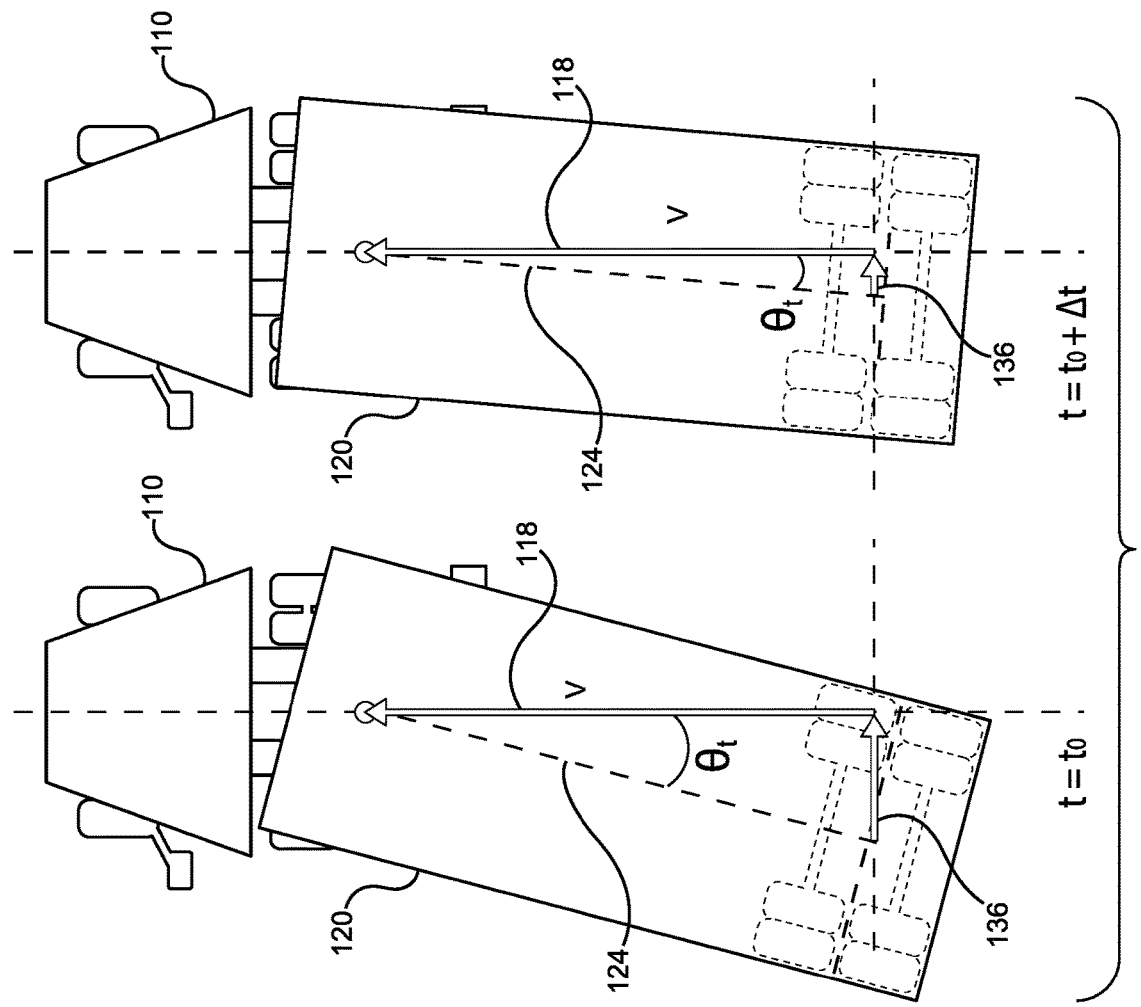
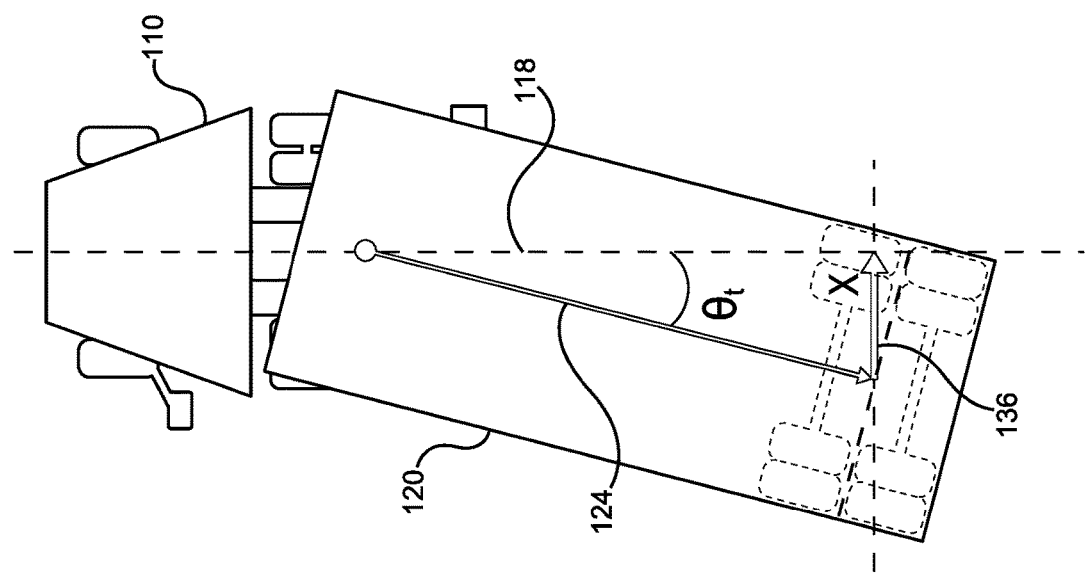
FIG. 7A
FIG. 7B

TRACTOR-BASED TRAILER CLEARANCE AND POSITIONING SYSTEM AND METHOD

BACKGROUND

Autonomous vehicles and vehicles with computer-assisted-driving capabilities are in increasing demand in the commercial trucking industry. They offer enhanced safety and lower operating costs. Designing and developing such vehicles presents multitudes of challenges for vehicle manufacturers. For example, an important task for an autonomous or computer-assisted semi (or tractor-trailer) truck is to drive in reverse with a trailer, for example into a space in a loading dock. In order to accomplish the docking, the truck's navigation system needs to have adequate information about the location of the trailer attached to the tractor, the location of the rear of the trailer, the orientation of the trailer with respect to the tractor, and how the trailer will respond to the movement of the tractor. Similar concerns exist with respect to other types of navigational tasks (e.g., monitoring/guiding turning maneuvers), in either autonomous or computer-assisted navigation systems.

It is with respect to these and other considerations that the aspects disclosed herein have been made. Although relatively specific problems may be discussed, it should be understood that the examples should not be limited to solving the specific problems identified in the background or elsewhere in this disclosure.

SUMMARY

The present technology relates to autonomous or computer-assisted driving of vehicles. In an aspect, the present technology provides automatic determination of certain physical characteristics of a trailer in a tractor-trailer truck based on images and other signals acquired by devices on the tractor of the truck.

In an example, a system for determining a length of a trailer hitched to a tractor in a tractor-trailer truck includes: a camera positioned relative to the tractor and configured to acquire an image of at least a portion of the trailer, the imaged portion including at least a rear portion of the trailer; a sensor configured to acquire information relating to relative arrangement (e.g., trailer angle) between the tractor and trailer at substantially the same time as the acquisition of the image; a processor configured to: receive from the camera the image, receive from the sensor the information relating to relative arrangement between the tractor and trailer, determine a position of the rear portion of the trailer in the image, and determine the length of the trailer based at least in part on the determined position of the rear portion of the trailer in the image and the information relating to the relative arrangement between the tractor and trailer.

In another example, a truck computer adapted to be installed in a tractor includes: at least one processor; and a memory operatively connected to the at least one processor, the memory storing instructions that when executed by the at least one processor, and when the truck computer is installed in a tractor and a trailer is hitched to the tractor, cause the processor to carry out a process that includes: receiving image data; receiving a sensor signal; identifying from the image data a rear portion of the trailer; determining a position of the rear portion of the trailer in an image the image data represent; determining a relative arrangement between the tractor and trailer based at least in part on the sensor signal; determining the length of the trailer based at least in part on the determined position of the rear portion of the trailer in the image and the relative arrangement between the tractor and trailer.

In another example, a method for determining a length of a trailer hitched to a tractor in a tractor-trailer truck includes: acquiring, using a camera on the tractor, an image of at least a portion of the trailer, the imaged portion including at least a rear portion of the trailer; determining, using a processor, a position of the rear portion of the trailer in the image; acquiring, using a sensor on the tractor, information relating to relative arrangement between the tractor and trailer at substantially the same time as the acquisition of the image; and determining, using a processor, the length of the trailer based at least in part on the determined position of the rear portion of the trailer in the image and the information relating to the relative arrangement between the tractor and trailer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 5B depicts a rendition of a few of the top of the trailer depicted in FIG. 5a.

FIG. 7A depicts an initial angular relationship between a tractor and a trailer attached to the tractor for calculating the wheelbase (WB) according to some embodiments.

FIG. 7B depicts evolution of the trailer angle with time as basis for calculating the wheelbase (WB) according to some embodiments.

DETAILED DESCRIPTION

The automotive industry is facing increasing demands for vehicles with self-driving and computer-assisted-driving capabilities. Designing and developing such vehicles present numerous technological challenges. Some of those challenges are unique to a commercial trucking industry. For example, for tractor-trailer (or "semi") trucks, certain maneuvers, such as backing a trailer into a docking position in a loading dock, can be complex due to the changing angular relationship between the tractor and trailer. To automatically maneuver, or provide computer-assisted maneuvering of, a tractor-trailer truck into a desired position in a safe and efficient manner, it is important to ascertain certain characteristics of the trailer. Such characteristics can include, for example, the length of the trailer and the wheelbase of the trailer. The example trailer clearance and positioning systems and methods described below provides automated determination of certain characteristics of trailers attached to a tractor based on signals received by camera(s) or sensor(s) mounted on the tractor. As a tractor is typically designed to have a variety of trailers attached to it, it is the most efficient to have a trailer clearance and positioning system mounted in a tractor instead of each trailer.

Figure 1:
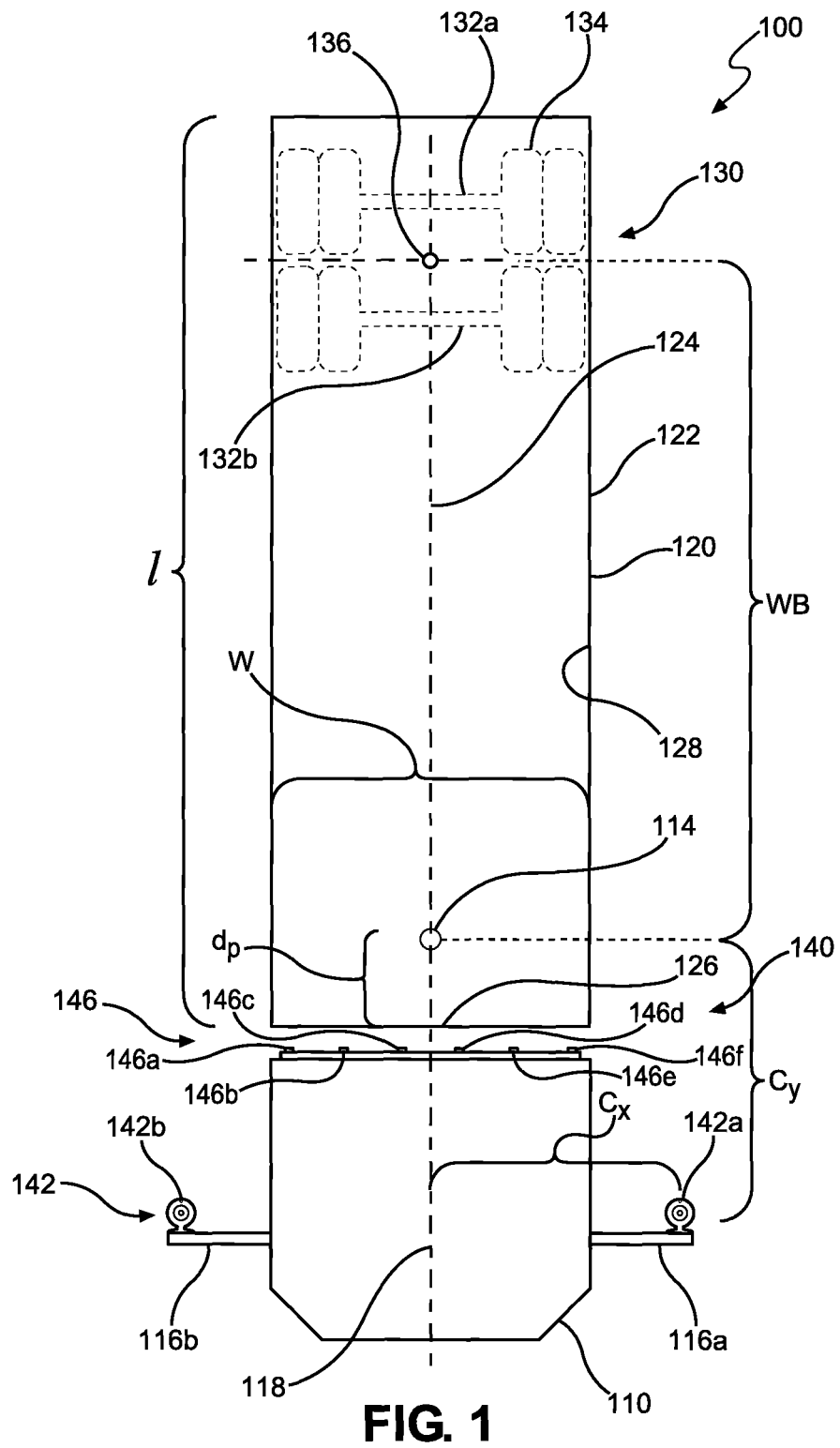
FIG. 1 depicts a top view of a tractor-trailer truck with cameras and sensors of a trailer clearance and positioning system for automatically determining various characteristics of the trailer according to some embodiments.

In some embodiments such as the example shown in FIG. 1, a tractor-trailer truck 100 includes a tractor 110 and a trailer 120. The tractor 110 includes a cab portion 112 and a kingpin 114, through which the trailer 120 is attached to the tractor 110, and which serves as a pivot point about which the trailer 120 can pivot to form various angular relationship with the tractor 110. The tractor 110 in this example further includes other structures, such as one or more side mirrors 116a, 116b.

The trailer 120 in this example includes a trailer frame 122, which in this example is of a rectangular shape having a length/and width w. However, the trailer frame 122 can be of other shapes suited for specific applications. For example, the trailer frame 122 can be of a circular cylindrical or elliptical cylindrical shape for transportation of a liquid payload. The trailer frame 122 also includes a rear wheel assembly 130, including one or more rear axles 132a, 132b and wheels 134 mounted on the rear axles 132a, 132b. The trailer frame 122 further includes a coupler (not shown) for engaging the trailer 120 with the kingpin 114 and permitting the trailer 120 to pivot about the kingpin 114 such that the trailer angle, i.e., the angle between the longitudinal axis 124 of the trailer 120 and the longitudinal axis 118 of the tractor 110, can vary as the tractor 110 pulls or pushes the trailer 120 in directions not parallel to the longitudinal axis 124 of the trailer 120. The trailer 120 is also characterized by a wheelbase WB, which is defined as the distance between the point of engagement with the kingpin 114 and the center of the rear wheel assembly 130. The trailer 120 is further characterized by a distance, $d_p$, between the front end of the trailer frame 122 and the pointed placement with the kingpin 114.

The tractor 110 in this example is equipped with a trailer clearance and positioning system 140, which includes one or more cameras 142 (as shown, including cameras 142a, 142b) and one or more sensors 146 (as shown, including sensors 146a, 146b, 146c, 146d, 146e, 146f). The cameras 142a, 142b in this example are mounted one on each side of the tractor 110, for example by attachment to, or being incorporated into, the side mirror assemblies 116a, 116b. The one or more cameras 142a, 142b in this example are aimed to the rear of the vehicle such that the rear end of the trailer 120 comes into the field-of-view of the cameras 142 at least for some range of the trailer angle. The one or more cameras 142 can be positioned at any location on the tractor so long as the part or parts of the trailer 122 be used to determine the size (e.g., length) of the trailer 120 come into the field-of-view of the cameras at least for some range of the trailer angle. For example, the camera(s) can be mounted on the back of the tractor cab.

The one or more sensors 146 in this example are located at the rear end of tractor cab 120 and, as described in more detail below, are configured to determine the trailer angle, i.e., the angle between the longitudinal axis 118 of the tractor 110 and the longitudinal axis 124 of the trailer 120.

In this example, the camera 142a is positioned at a distance of $C_x$ from the longitudinal axis 118 and a distance of $C_y$ from a line perpendicular to the longitudinal axis 118 and passing through the kingpin 114. The values of $C_x$ and $C_y$, as described in more detail below, are used in calculating certain characteristics, such as length, of the trailer 120.

Figure 2:
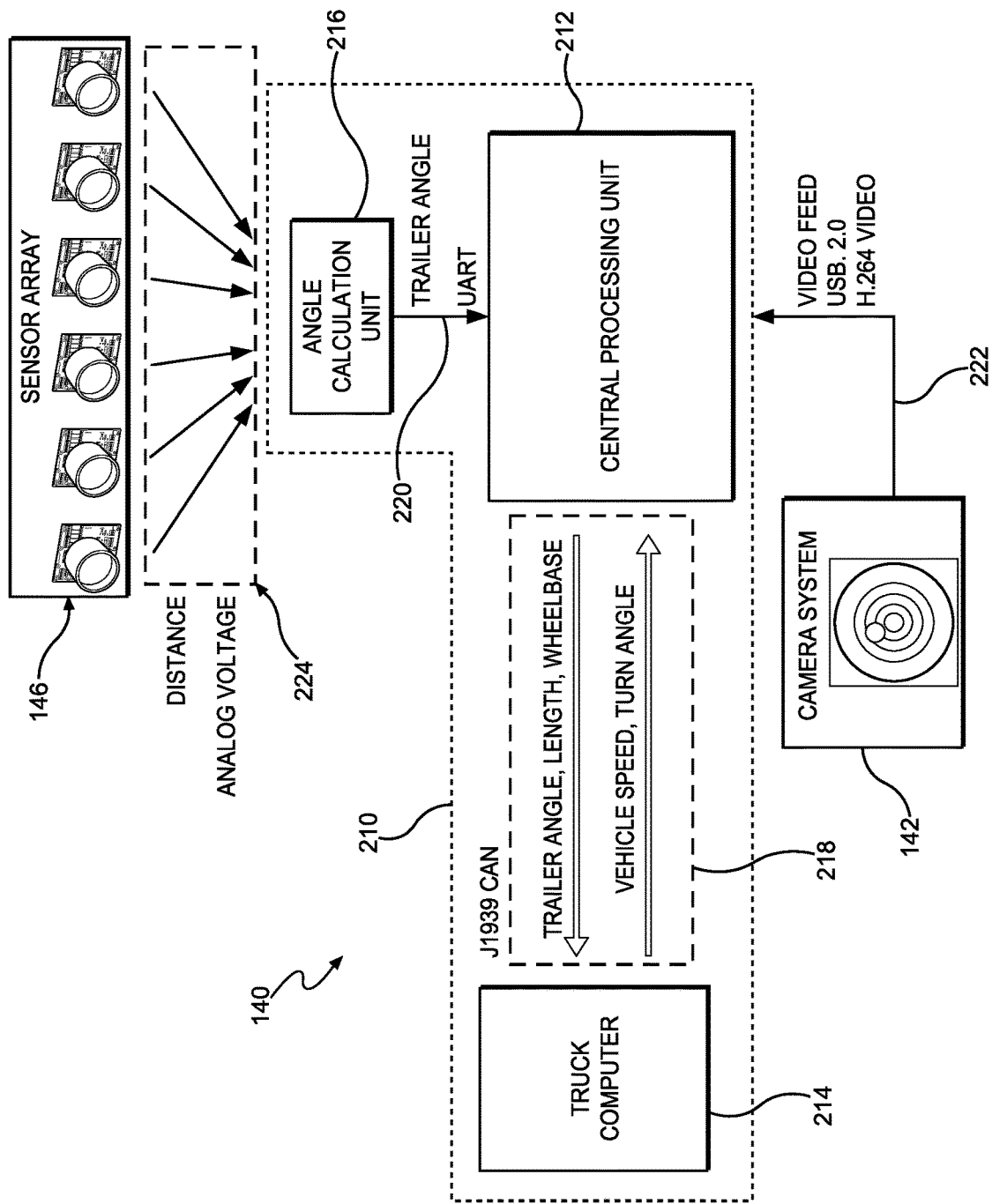
FIG. 2 depicts a trailer clearance and positioning system according to some embodiments.

In some embodiments, such as the one depicted in FIG. 2, the trailer clearance and positioning system 140 includes one or more cameras 142 for imaging the trailer 120, and one or more sensors 146 for measuring the trailer angle, as described above. The trailer clearance and positioning system 140 further includes a processing unit 210 which in this example includes a central processing unit (CPU) 212, a truck computer 214, and an angle calculating unit 216. The truck computer 214 in some embodiments includes a vehicle electronic control unit (ECU), which is connected to various sensors 146 to acquire parameters of the state of operation of a truck. Example of such sensors include a wheel speed sensor, a steering wheel angle/steering torque sensor, a yaw rate sensor, and a lateral acceleration sensor. An ECU can also be connected to actuators and generate output signals to control various aspects of the operations of a truck. For example, an ECU can be connected to actuators to control the speed, steering angle and braking of a truck.

The CPU 212 and the truck computer 214 are linked in this example by such data communication link 218, which in one example is a controller area network (CAN) link based on the Society of Automotive Engineers (SAE) J1939 protocol. The trailer angle calculated by the angle calculation unit 216 is transmitted to the CPU 212 in this example by a Universal Asynchronous Receiver-Transmitter (UART) device, which can be a part of the input/output (I/O) structure of the angle calculation unit 216. The signals from the sensors 146 in this example are analog signals 224, which are fed to the analog inputs of the angle calculation unit 216; in alternative embodiments, digital inputs may be provided to the angle calculation unit as well or in place of such analog inputs. Images captured by the cameras 142 is transmitted to the CPU 212 in this example via a serial link, such as a Universal Serial Bus (USB) link.

The CPU 212, as described in more detail below, carries out the process of calculating the trailer angle, trailer length and wheelbase based at least in part on its the images acquired by the camera 142 and/or the trailer angle calculated by such the annual calculation unit 216 based on the signals acquired by the sensors 146 and/or vehicle information (e.g., tractor speed and turn angle (i.e., the position of the steering wheel)) supplied by the truck computer 214. The CPU 212 further supplies the calculated values to the truck computer 214 via the data communication link 218 to enable the truck computer 214 to calculate control parameters such as minimum and the maximum turn radii in four directions (forward-left, forward-right, backward-left, and backward-right) and to generate output signals based on the calculated control parameters to control the tractor to autonomously maneuver the truck or to guide a driver to maneuver the truck.

The CPU 212 can be any processor, capable of carrying out image processing and other computational tasks for specific applications, with appropriate peripheral circuits. The truck computer 214 can be any processor suitable for requisite vehicle monitoring and control. Such computers are commercially available and typically installed in trucks as sold. The angle calculation unit 216 can be, or be included in, any suitable processor, including a microprocessor or microcontroller. In this example, the sensors 146, as described in more detail below, are ultrasonic distance sensors, and the angle calculation unit 216 is a microcontroller capable of calculating the trailer angle from the distance measurements by the sensors 146.

Although the processor 210 in this example includes three different processors (CPU 212, truck computer 214, and angle calculation unit 216), any suitable number of processors can be included. For example, the functionalities of the CPU 212 and truck computer 214 can be included in a single truck computer; alternatively, the functionalities of all three processors 212, 214, 216 can be included in a single truck computer.

Figure 3A:
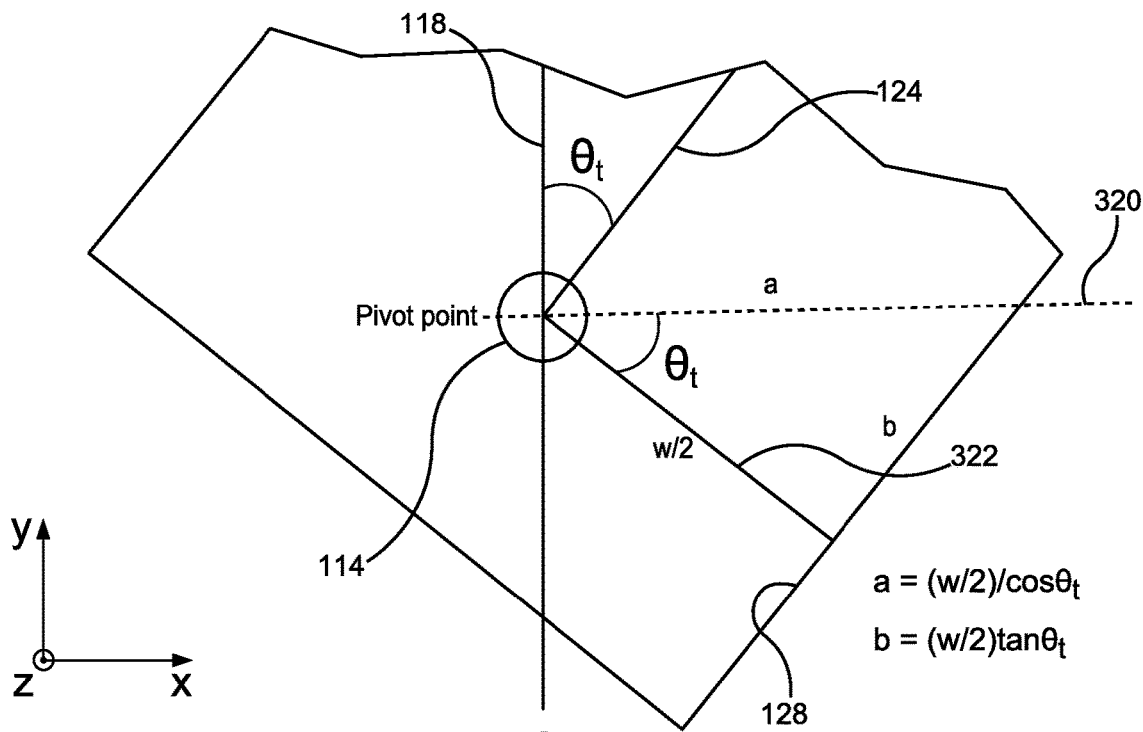
FIG. 3A depicts a top view of a trailer portion near the pivot point (the location of the kingpin of the tractor when the trailer is attached to the tractor) and certain variables used for calculating the trailer length according to some embodiments.
Figure 3B:
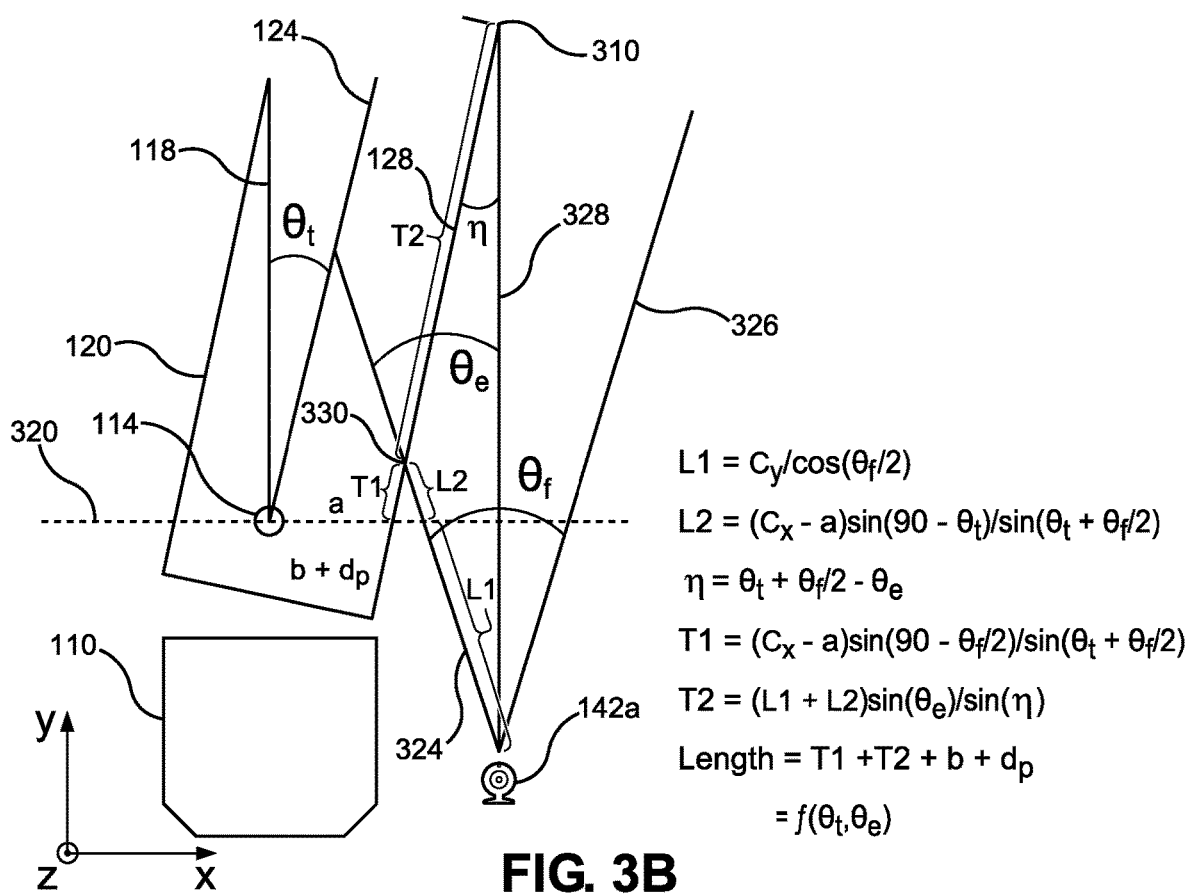
FIG. 3B depicts a partial top view of a tractor-trailer truck and certain variables used for calculating the trailer length in some embodiments.

With reference to FIGS. 3A and 3B, in some embodiments, a trailer clearance and positioning system is configured to determine the length of a trailer based on the measured trailer angle and one or more digital images of at least a portion of the trailer including the back edge of the trailer. In the example described below, the length of a trailer is calculated using one or more digital images taken by a camera with a known angle, $\theta_f$, of field-of-view and located at a known distance $C_x$ from the longitudinal axis 118 (extending in the y-direction) of the tractor 110 and a known distance $C_y$ from a line perpendicular to the longitudinal axis 118 (i.e., extending in the x-direction) and passing through the kingpin 114. It is further assumed that the width, w, of the trailer 120 and the distance, $d_p$, between the front edge 126 of the trailer 120 and the kingpin 114 are known.

In this example, a portion on the left side (from the driver's perspective) 128 of the trailer 120 is imaged, and the left rear corner 310 of the trailer 120 is captured in the one or more images. The various quantities and variables denoted in FIG. 3A are:

- a: the length of the line segment between the kingpin 114 and the edge 128 of the trailer 120 along a line 320 that is perpendicular to the longitudinal axis 118 of the tractor and passes through the kingpin 114.
- b: the length of the line segment between the competing 114 and the edge 128 of the trailer 120 along a line 322 that is perpendicular to the longitudinal axis 124 of the trailer 120 and passes through the kingpin 114.
- $\theta_f$: the angle spanning the field-of-view of the camera 142a. The left (from the perspective of the camera 142a looking rearward (i.e., in the y-direction)) edge of the field-of-view is shown as the line 324; the right edge of the field-of-view is shown as the line 326.
- L1: the length of the segment of line 324 between the camera 142a and the line 320.
- L2: the length of the segment of line 324 between the line 320 and the edge 128.
- $\theta_t$: the trailer angle, i.e., the angle between the longitudinal axis 118 of the tractor and the longitudinal axis 124 of the trailer.
- $\theta_e$: the angle between the line 324 and the line 328 connecting the camera 142a and the left rear corner 310 of the trailer 120.
- η: the angle between the edge 128 of the trailer 120 and the line 328.
- T1: the length of the line segment along the edge 128 of the trailer 120 between the line 320 and the intersection 330 of the line 324 and the edge 128 of the trailer 120. The intersection 330 represents the left edge of the images.
- T2: the length of the line segment along the edge 128 of the trailer 120 between the intersection 330 and the left rear corner 130 of the trailer 120.

Based on purely geometric considerations, the following can be established:

$$L1=C_y/\cos(\theta_f/2);$$

$$L2=(C_x-a)\sin(90-\theta_t)/\sin(\theta_t+\theta_f/2);$$

$$\eta=\theta_t+\theta_f/2-\theta_e;$$

$$T1=(C_x-a)\sin(90-\theta_f/2)/\sin(\theta_t+\theta_f/2);$$

$$T2=(L1+L2)\sin(\theta_e)/\cos(\eta);$$

and the total length, l, is given by:

$$l=T1+T2+b+d_p=f(\theta_t,\theta_e).$$

That is, the total length, l, is a function of the turning angle, $\theta_t$, and the angle, $\theta_e$, between the edge 324 of the field-of-view and the line 328 connecting the camera 142a and the left rear corner 310 of the trailer 120. $\theta_t$, as described in detail below, can be measured with the sensors 146; $\theta_e$ can be measured by the horizontal position of the left rear corner 310 of the trailer 120 in the images capture by the camera 142a. As the total number of pixels in the horizontal direction in the images correspond to the angle, $\theta_f$, spanning the field-of-view, the number of pixels from the left edge of the images to the left rear corner 310 in the images corresponding to $\theta_e$, and $\theta_e$ can therefore be calculated by the processor 210 (more specifically, the CPU 212 in the example shown in FIG. 2). Thus, the total length of the trailer 120 can be determined from the images captured by the camera 142a and the trailer angle measured by the sensors 146.

Figure 4:
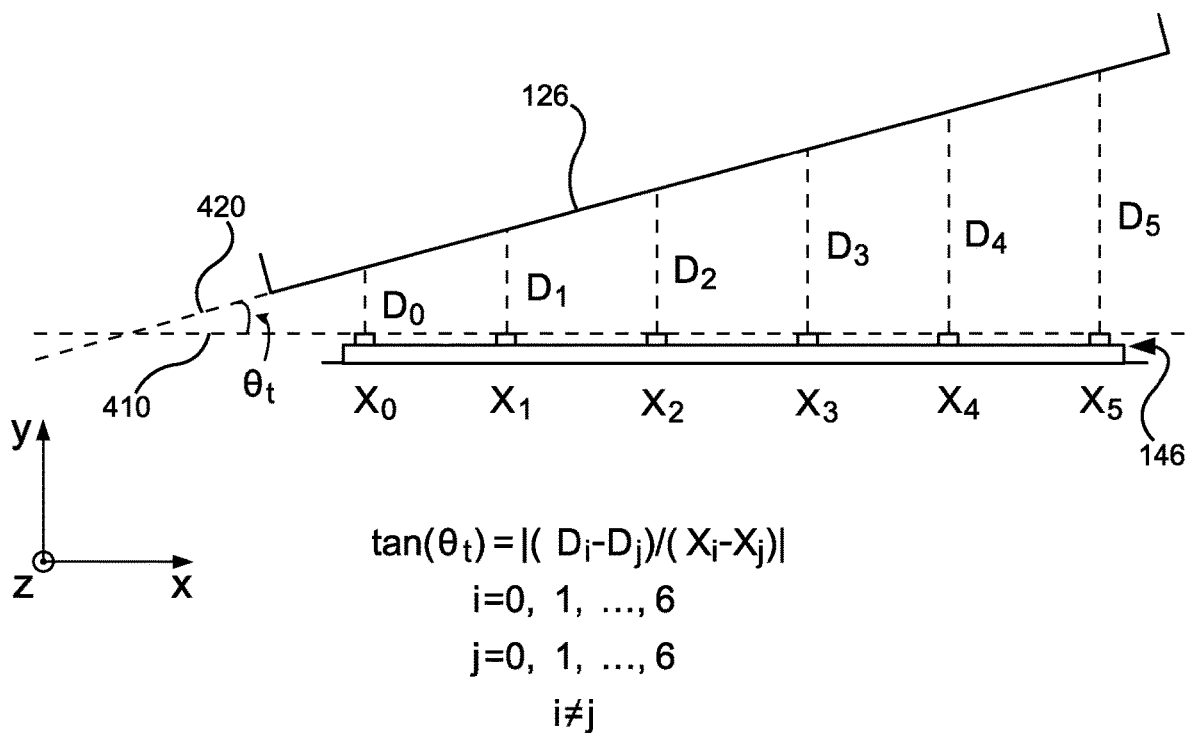
FIG. 4 depicts an angular relationship between an array of sensors on the back edge of a tractor and front edge of the trailer attached to the tractor (trailer angle), and certain variables used to calculate the trailer angle according to some embodiments.

In some embodiments, the trailer angle can be measured using the sensors 146, as shown in the example in FIG. 4. In this example, ultrasonic distance sensors 146 are arranged along a horizontal (x-) direction at coordinates $x_0, x_1, \ldots x_5$. Each of the sensors 146 measures a respective distance $D_0, D_1, \ldots D_5$ from the front edge 126 of the trailer 120 to the sensor. The points with coordinates $(x_0, D_0), (x_1, D_1), \ldots (x_5, D_5)$ in this example are fitted (e.g., by least-square regression) to a straight line, and the slope of the straight-line is $\tan \theta_t$. The trailer angle, $\theta_t$, can be determined using the distance sensors 146.

It is noted that although six sensors are used in the examples given above, other numbers of sensors can be used. For example, a single distance sensor may be used to determine the trailer angle by first measuring an initial distance for a known trailer angle (e.g., $\theta_t=0°$) and subsequently measuring distances and determining the corresponding trailer angles based on the measured distances and the initial distance. Moreover, other types of distance sensors and other types of sensors in general can be used to determine the trailer angle. For example, infrared depth cameras mounted on a tractor may be used to determine distances between the cameras and the front edge of a trailer in order to determine the trailer angle. As another example, digital cameras can be used to capture images of the back edge of the tractor cab and the front edge of the trailer from above, and the images can be processed by a processor to determine the trailer angle. For example, the so-called Canny edge detection algorithm can be used by the processor to locate the back edge of the tractor cab in the front edge of the trailer, and the angle between the edges can then be calculated by the processor.

Figure 5A:
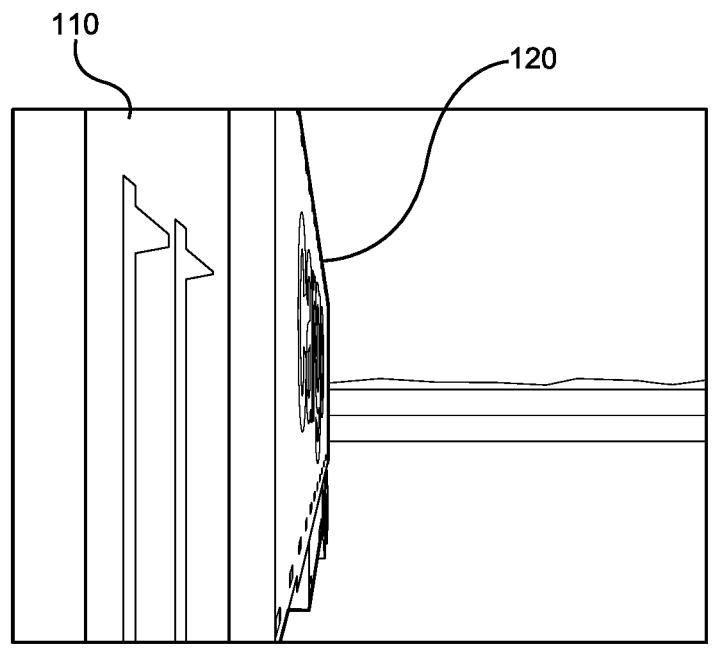
FIG. 5A depicts a rendition of an image of a side of a tractor-trailer truck, the image being taken by a camera mounted on a side of the tractor of the tractor-trailer truck according to some embodiments.
Figure 5B:
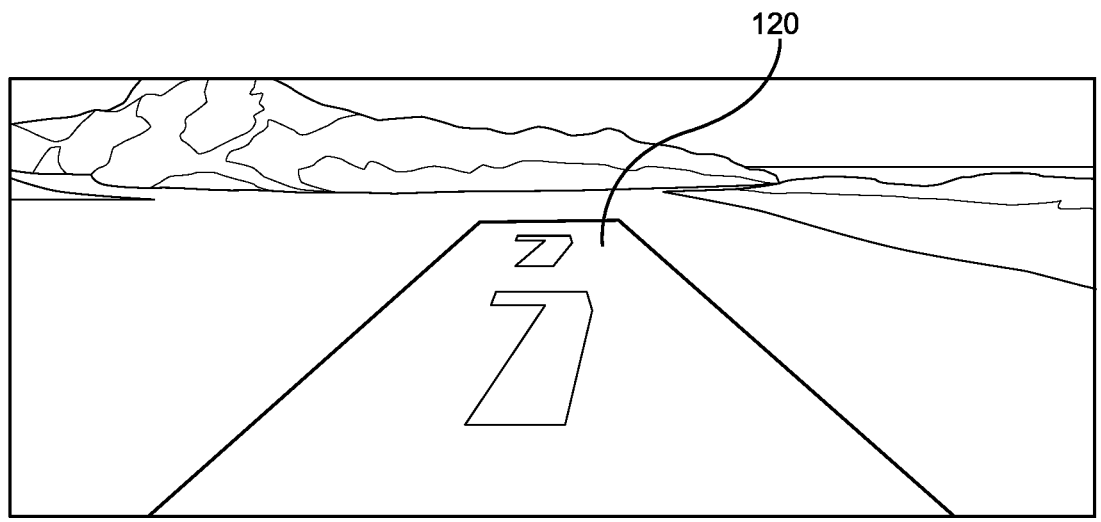

FIGS. 5A and 5B show simulated images of a trailer 120 captured by cameras 142a located on a side and top, respectively, of a tractor 110 to which the trailer 120 is attached. Similar real-word images can be used in determining the trailer length.

Figure 6:
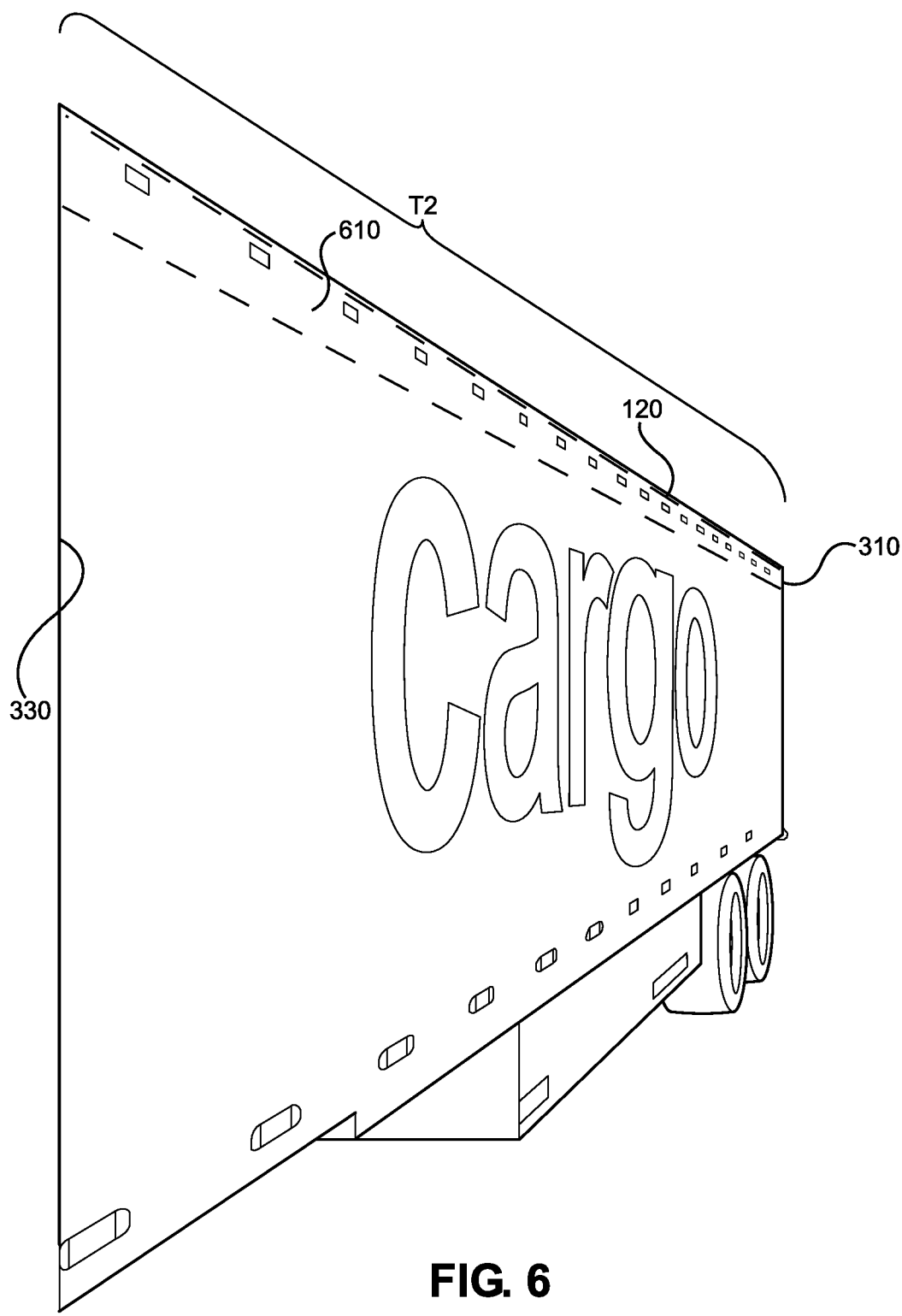
FIG. 6 depicts the result of edge detection processing of an image of a side of the trailer according to some embodiments.

FIG. 6 shows an image of a trailer 120 captured within the field-of-view of a camera 142a. The image has been processed, for example, using a Canny edge detection algorithm. Such processing facilitates the location of edges of the trailer 120. In the example shown in FIG. 6, the top edge 610 (indicated between the dashed lines) is used to locate the left rear corner 310 of the trailer 120. The horizontal distance between the rear corner 310 and the left edge of the image 330 thus corresponds to the length T2 used in calculating the length of the trailer 120, as described above.

Although the top edge 610 is used to locate the package of the trailer 120 in the example shown in FIG. 6, other edges can be used. For example, the vertical back edge in FIG. 6 can be used. Other methods can also be used to identify the back edge of a trailer from its images. For example, machine learning (e.g., unsupervised machine learning using artificial neural networks) based on prior images of trailers can be used to identify various structural features, including the various edges, of the trailer from its images.

In some embodiments, the wheelbase (WB) of a trailer can be determined using the measured trailer angles and/or images captured of the trailer. In one example, illustrated in FIGS. 7A and 7B, WB is determined using the measured trailer angles but without using any image of the trailer 120. In this example, as shown in FIG. 7A, the tractor 110 drives along a straight line at a speed, V, at an initial time, $t_0$, when the trailer angle is non-zero; after a period of time, $\Delta t=T$, the trailer will straighten out, i.e., the trailer angle becomes zero. At that point the total distance, X, traveled relative to the tractor 110 is approximately WB×tan(initial trailer angle). Thus, $$X=\int_{t_0}^{t_0+T} V \tan(\theta_t) dt, \text{ and}$$

$$WB=X/\tan(\theta_t(t_0)).$$

It is noted that the tractor speed, V, and information regarding whether the tractor is driving straight (i.e., the turn angle) and other information on the tractor's operating condition can be supplied from the truck computer 214.

It is further noted that the end time of the integration used in the above example is the time when the trailer angle becomes zero, but that the end time can be any time. The non-zero trailer angle at the end time would introduce some additional complexity in trigonometric calculation but would be straightforward. Furthermore, the tractor 110 needs not be driven in a straight line; as the movement of the center point 136 is subject to the constraint that it is at a distance of WB from the kingpin 114, WB can be computed from the trailer angle as a function of the tractor motion.

Figure 8:
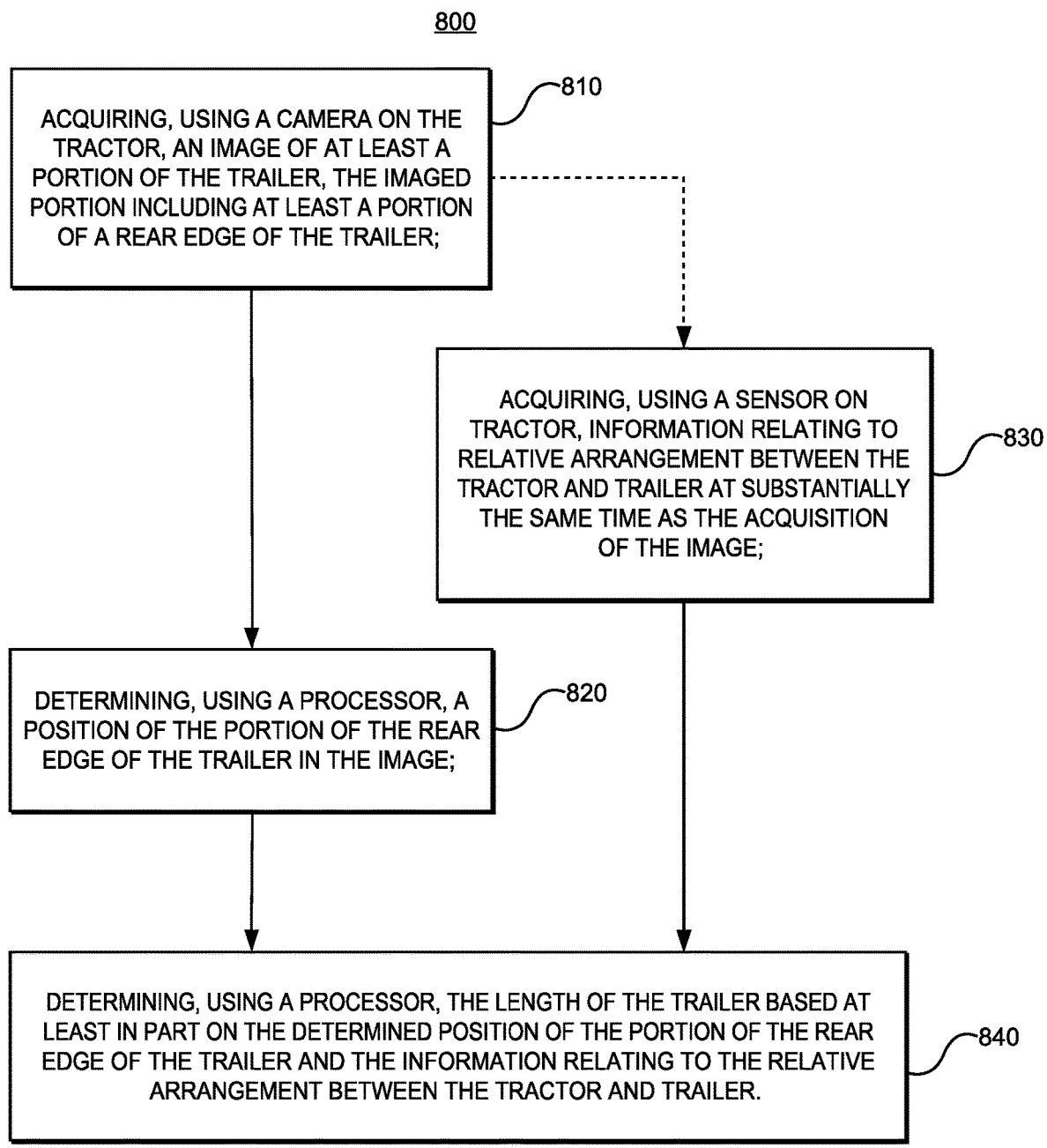
FIG. 8 outlines a process of determining a trailer dimension according to some embodiments.

In some embodiments, as outlined in FIG. 8, a method 800 for determining a length of a trailer hitched to a tractor in a tractor-trailer truck includes: acquiring (810), using a camera on the tractor, an image of at least a portion of the trailer, the imaged portion including at least a portion of a rear edge of the trailer; determining (820), using a processor, a position of the portion of the rear edge of the trailer in the image; acquiring (830), using a sensor on the tractor, information relating to relative arrangement between the tractor and trailer at substantially the same time as the acquisition of the image; and determining (840), using a processor, the length of the trailer based at least in part on the determined position of the portion of the rear edge of the trailer in the image and the information relating to the relative arrangement between the tractor and trailer.

An example of the method outlined above includes the following:
  When the truck begins making a left turn, a rear-facing side-mirror mounted camera is activated to acquire images;
  At substantially the same time as the images are acquired, distance sensors are activated to determine the trailer angle;
  Each of the images is processed:
    Convert the acquired images to grayscale;
    Gaussian Blur filter is applied to remove noise from the images.
    A Canny edge detection algorithm is run to locate edges in each image (example: FIG. 6);
    The top edge of the trailer in the images is tracked to the left rear corner of the trailer;
    The x-coordinates of the left rear corner of the trailer in the images are determined;
  Using the x-coordinates and the trailer angle, the distance from the kingpin to the end of the trailer (b+T1+T2) is calculated using the formulas above.
  The calculated trailer lengths are averated as images are captured, with the values that would cause dramatic changes in the length average rejected.

Figure 9:
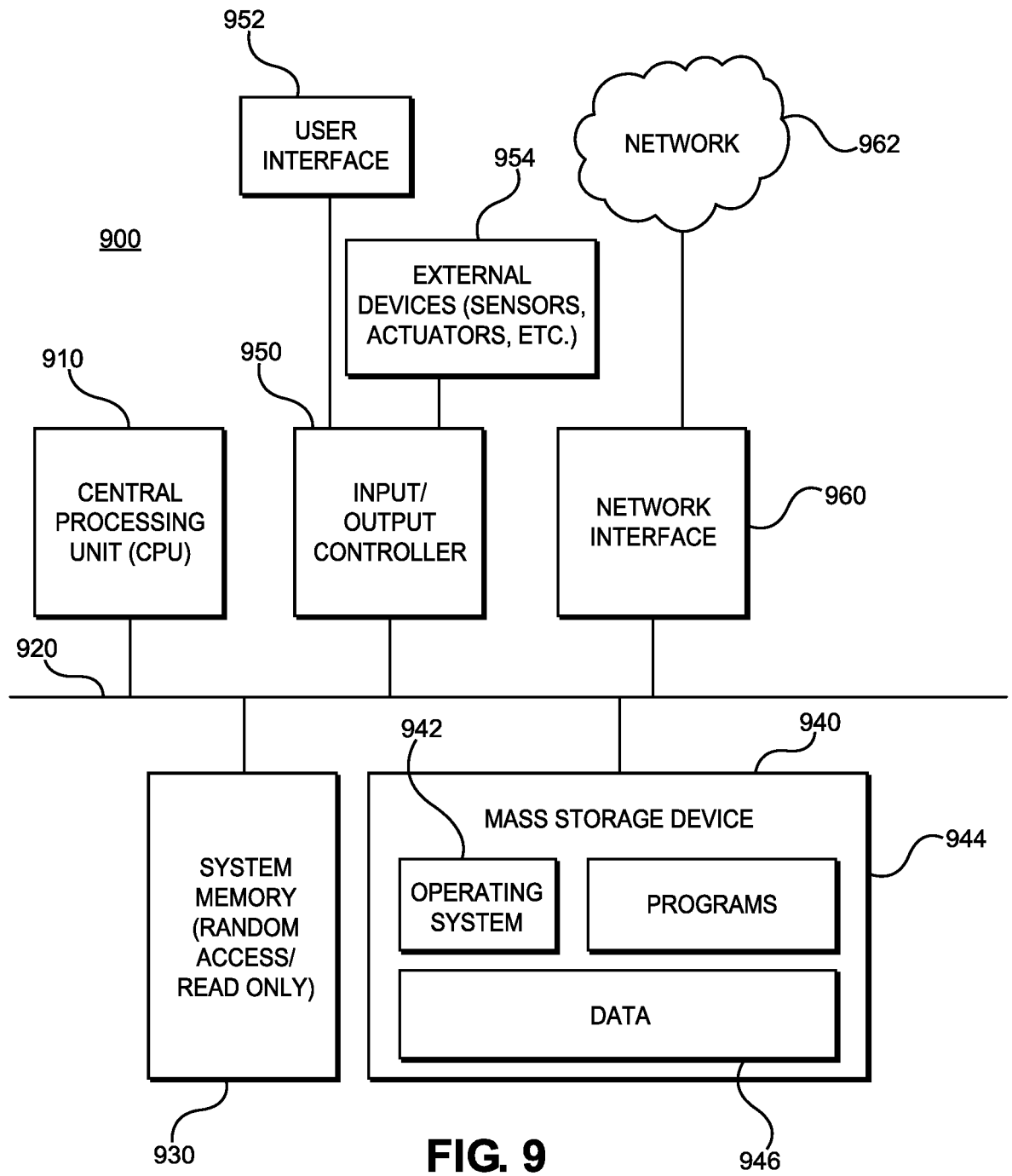
FIG. 9 depicts a computer programmed to carry out certain processes disclosed in this application according to some embodiments While examples of the disclosure are amenable to various modifications and alternative forms, specific aspects have been shown by way of example in the drawings and are described in detail below. The intention is not to limit the scope of the disclosure to the particular aspects described.

As alluded to above, in some embodiments, certain processes described above are carried out by a computer system, such as an onboard computer system. Such a computer system in some embodiment includes one or more special-purpose computers, which can be one or more general-purpose computers specifically programmed to perform the methods. For example, a computer 900 schematically shown in FIG. 9 can be used. The computer 900 includes a processor 910, which is connected to the other components of the computer via a data communication path such as a bus 920. The components include system memory 930, which is loaded with the instructions for the processor 910 to perform the methods described above. Included is also a mass storage device, which includes a computer-readable storage medium 940. The mass storage device is an electronic, magnetic, optical, electromagnetic, infrared, and/or a semiconductor system (or apparatus or device). For example, the computer-readable storage medium 940 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer-readable storage medium 940 includes a compact disk-read only memory (CD-ROM), a compact disk-read/ write (CD-R/W), and/or a digital video disc (DVD). The mass storage device 940 stores, among other things, the operating system 942; programs 944, including those that, when read into the system memory 920 and executed by the processor 910, cause the computer 900 to carry out the processes described above; and Data 946. Data 946 can include, for example, various parameters of various components of the tractor and data from external sources, such as data acquired by various sensors and cameras external to the computer 900. The computer 900 also includes an I/O controller 950, which inputs and outputs to a User Interface 952. The User Interface 952 can include, for example, various parts of the vehicle instrument cluster, audio devices, a video display, input devices such as buttons, dials, a touch-screen input, a keyboard, mouse, trackball and any other suitable user interfacing devices. The I/O controller 950 can have further input/out ports for input from, and/or output to, devices such as External Devices 954, which can include sensors, actuators, external storage devices, and so on. The computer 900 can further include a network interface 960 to enable the computer to receive and transmit data from and to remote networks 962, such as cellular or satellite data networks, which can be used for such tasks as remote monitoring and control of the vehicle and software/firmware updates.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. One skilled in the art will recognize other embodiments or improvements that are within the scope and spirit of the present technology. In addition, one having skill in the art will recognize that the various examples and embodiments described herein may be combined with one another. Therefore, the specific structure, acts, or media are disclosed only as illustrative embodiments. The scope of the technology is defined by the following claims and any equivalents therein.

The invention claimed is:

1. A system for determining a length of a trailer hitched to a tractor in a tractor-trailer truck, the system comprising:
    a camera positioned at a known distance from the longitudinal axis of the tractor and a known distance from a line perpendicular to the longitudinal axis of the tractor, the camera configured to acquire an image of at least a portion of the trailer including at least a rear portion of the trailer;
    a sensor configured to acquire information relating to relative arrangement between the tractor and trailer at substantially the same time as the acquisition of the image;
    a processor configured to:
        receive from the camera the image;
        receive from the sensor the information relating to relative arrangement between the tractor and trailer, wherein the information relating to relative arrangement between the tractor and trailer indicates an angle between the longitudinal axis of the tractor and a longitudinal axis of the trailer;
        determine a position of the rear portion of the trailer in the image, based at least in part on the camera position from the longitudinal axis of the tractor and the line perpendicular to the longitudinal axis of the tractor; and
        determine the length of the trailer based at least in part on the determined position of the rear portion of the trailer in the image and the information relating to the relative arrangement between the tractor and trailer; and
        determine a wheelbase of the trailer based at least in part on the angle between the longitudinal axis of the tractor and the longitudinal axis of the trailer at an initial position and a total straight-line distance traveled by the tractor to align the longitudinal axis of the tractor with the longitudinal axis of the trailer.

2. The system of claim 1, wherein the sensor comprises a distance sensor array configured to measure distances between the sensor array and a portion of the trailer, and wherein the processor is configured to calculate the angle between the longitudinal axis of the tractor and the longitudinal axis of the trailer based at least in part on the measured distances.

3. The system of claim 1, wherein the processor is configured to determine the wheelbase of the trailer without using any information from any image acquired by the camera.

4. The system of claim 1, wherein the processor is further configured to set one or more parameters of the tractor's operation based at least in part on the angle between the longitudinal axis of the tractor and the longitudinal axis of the trailer and the wheelbase.

5. The system of claim 1, wherein the processor is further configured to process the images to detect edges within the images and use at least one of the detected edges to identify the rear portion of the trailer.

6. A truck computer adapted to be installed in a tractor, the truck computer comprising:
    at least one processor; and a memory operatively connected to the at least one processor, the memory storing instructions that when executed by the at least one processor, and when the truck computer is installed in a tractor and a trailer is hitched to the tractor, cause the processor to carry out a process comprising:

receiving image data from a camera positioned at a known distance from a longitudinal axis of the tractor and a known distance from a line perpendicular to the longitudinal axis of the tractor;

receiving a sensor signal;

identifying from the image data a rear portion of the trailer;

determining a position of the rear portion of the trailer in an image the image data represent, based at least in part on the camera position from the longitudinal axis of the tractor and the line perpendicular to the longitudinal axis of the tractor;

determining a relative arrangement between the tractor and trailer based at least in part on the sensor signal;

determining the length of the trailer based at least in part on the determined position of the rear portion of the trailer in the image and the relative arrangement between the tractor and trailer; and determining a wheelbase of the trailer based at least in part on the angle between the longitudinal axis of the tractor and the longitudinal axis of the trailer at an initial position and a total straight-line distance traveled by the tractor to align the longitudinal axis of the tractor with the longitudinal axis of the trailer.

7. The truck computer of claim 6, wherein the process further includes acquiring a parameter of a state of operation of the tractor, wherein determining the wheelbase includes determining a wheelbase of the trailer further based on the parameter.

8. The truck computer of claim 7, wherein the parameter is speed of the truck.

9. The truck computer of claim 6, wherein determining a position of the rear portion of the trailer includes detecting edges within the images and using at least one of the detected edges to identify the rear portion of the trailer.

10. The truck computer of claim 6, wherein the process further includes determining a parameter of an aspect of operation of the tractor.

11. The truck computer of claim 10, wherein determining a parameter of an aspect of operation of the tractor includes determining at least one limit of a turn radius of the truck.

12. A method for determining a length of a trailer hitched to a tractor in a tractor-trailer truck, the method including:

acquiring, using a camera positioned a known distance from a longitudinal axis of the tractor and a known distance from a line perpendicular to the longitudinal axis of the tractor, an image of at least a portion of the trailer, the imaged portion including at least a rear portion of the trailer;

determining, using a processor, a position of the rear portion of the trailer in the image, based at least in part on the camera position from the longitudinal axis of the tractor and the line perpendicular to the longitudinal axis of the tractor;

acquiring, using a sensor on the tractor, information relating to relative arrangement between the tractor and trailer at substantially the same time as the acquisition of the image, the information including an angle between the longitudinal axis of the tractor and a longitudinal axis of the trailer;

determining, using a processor, the length of the trailer based at least in part on the determined position of the rear portion of the trailer in the image and the information relating to the relative arrangement between the tractor and trailer; and determining a wheelbase of the trailer based at least in part on the angle between the longitudinal axis of the tractor and the longitudinal axis of the trailer at an initial position and a total straight-line distance traveled by the tractor to align the longitudinal axis of the tractor with the longitudinal axis of the trailer.

13. The method of claim 12, wherein acquiring the angle comprises using a distance sensor array to measure distances between the sensor array and a portion of the trailer, and calculating the angle between the longitudinal axis of the tractor and the longitudinal axis of the trailer based at least in part on the measured distances.

14. The method of claim 12, wherein determining a position of the rear portion of the trailer in the image includes processing the image to detect edges within the images and using at least one of the detected edges to identify the rear portion of the trailer.

* * * * *